US012524812B2

(12) United States Patent
Griffin et al.

(10) Patent No.: US 12,524,812 B2
(45) Date of Patent: *Jan. 13, 2026

(54) METHOD FOR CHARACTERIZING ASSET GROUPS SPANNING MULTIPLE ASSET CLASSES IN A COMPUTER NETWORK

(71) Applicant: Sevco Security, Inc., Austin, TX (US)

(72) Inventors: Aaron Griffin, Seattle, WA (US); Mark Russo, Montgomery, NJ (US); Mark Shipley, Seattle, WA (US); Nevins Bartolomeo, Portland, ME (US); Luis Diego Cabezas, Ann Arbor, MI (US); Dean Mekkawy, New York, NY (US); Jeremiah Clark, Easton, MD (US); Craig Cason, Troy, IL (US); Steve Taylor, New York, NY (US); Jacob Hackett, Boston, MA (US)

(73) Assignee: Sevco Security, Inc., Austin, TX (US)

( * ) Notice: Subject to any disclaimer, the term of this patent is extended or adjusted under 35 U.S.C. 154(b) by 230 days.

This patent is subject to a terminal disclaimer.

(21) Appl. No.: 18/533,039

(22) Filed: Dec. 7, 2023

(65) Prior Publication Data

US 2024/0193694 A1   Jun. 13, 2024

Related U.S. Application Data

(60) Provisional application No. 63/431,265, filed on Dec. 8, 2022.

(51) Int. Cl.
*G06Q 40/06* (2012.01)
*G06Q 10/0635* (2023.01)

(52) U.S. Cl.
CPC ......... *G06Q 40/06* (2013.01); *G06Q 10/0635* (2013.01)

(58) Field of Classification Search
CPC ........................ G06Q 40/06; G06Q 10/0635
USPC ............................................ 726/1; 709/217
See application file for complete search history.

(56) References Cited

U.S. PATENT DOCUMENTS

| 10,701,049 | B2* | 6/2020 | Murthy | H04L 63/102 |
| 11,647,027 | B2* | 5/2023 | Guy | H04L 41/12 |
| | | | | 726/1 |
| 2014/0344452 | A1* | 11/2014 | Lipstone | H04L 41/0803 |
| | | | | 709/224 |
| 2014/0344453 | A1* | 11/2014 | Varney | H04L 41/50 |
| | | | | 709/224 |
| 2018/0097789 | A1* | 4/2018 | Murthy | H04L 63/0227 |

(Continued)

*Primary Examiner* — Liang Che A Wang
(74) *Attorney, Agent, or Firm* — Run8 Patent Group, LLC; Peter Miller; Brian T. Chew

(57) ABSTRACT

A method includes: accessing a first set of attributes exhibited by a first asset during a time interval; identifying a first association between the first asset and a second asset based on the first set of attributes; accessing a second set of attributes exhibited by the second asset during the time interval; based on the first association between the first asset and the second asset, associating the first asset with a first subset of attributes in the second set of attributes; identifying an asset group, including the first asset, exhibiting a target combination of attributes during the time interval based on the target combination of attributes represented in the first set of attributes and the first subset of attributes, in the second set of attributes, associated with the first asset; and executing an action on assets in the asset group.

20 Claims, 6 Drawing Sheets

(56) References Cited

U.S. PATENT DOCUMENTS

| | | | |
|---|---|---|---|
| 2020/0213289 A1* | 7/2020 | Murthy | H04L 63/08 |
| 2021/0157920 A1* | 5/2021 | Zheng | G06F 21/566 |
| 2022/0329604 A1* | 10/2022 | Guy | H04L 41/0893 |

* cited by examiner

METHOD FOR CHARACTERIZING ASSET GROUPS SPANNING MULTIPLE ASSET CLASSES IN A COMPUTER NETWORK

CROSS-REFERENCE TO RELATED APPLICATIONS

This application claims the benefit of U.S. Provisional Application No. 63/431,265, filed on 8 Dec. 2022, which is incorporated in its entirety by this reference.

This application is related to U.S. patent application Ser. No. 17/720,163, filed on 13 Apr. 2022, U.S. patent application Ser. No. 18/101,404, filed on 25 Jan. 2023, U.S. patent application Ser. No. 18/371,873, filed on 22 Sep. 2023, and U.S. patent application Ser. No. 18/371,891, filed on 22 Sep. 2023, each of which is incorporated in its entirety by this reference.

TECHNICAL FIELD

This invention relates generally to the field of Internet security and more specifically to a new and useful method for characterizing asset groups spanning multiple asset classes in a computer network within the field of Internet security.

DESCRIPTION OF THE EMBODIMENTS

Figure 1:
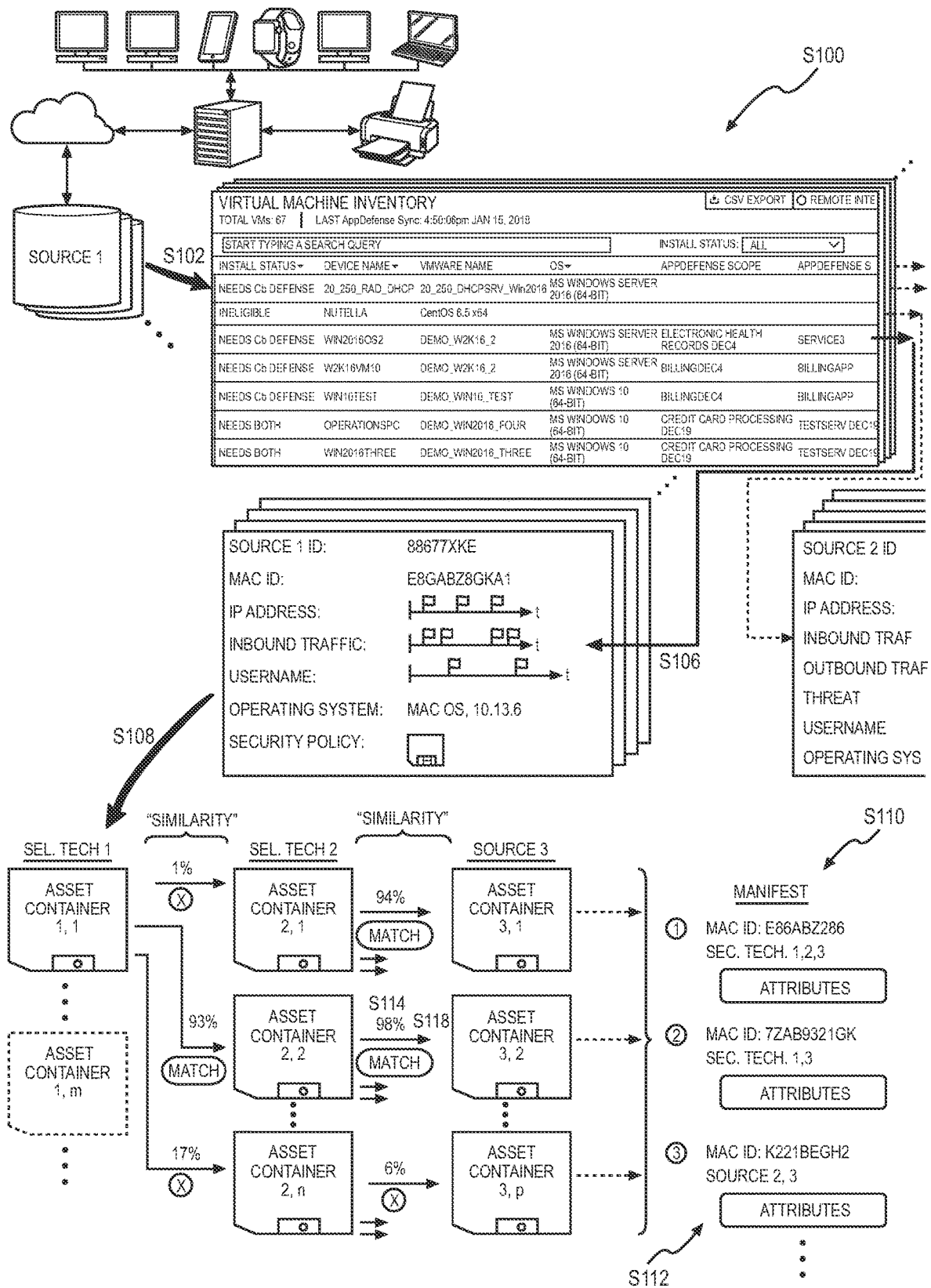
FIG. 1 is a flowchart representation of a method.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

As shown in FIGS. 1, 2A, 2B, 3A, 3B, and 4, a method S100 includes: accessing a first set of objects, generated by a set of sources during a first time interval, representing attributes of a first set of assets including a first asset and a second asset in Block S102; partitioning the first set of objects into a first set of object groups in Block S106, each object group in the first set of object groups representing an asset in the first set of assets; for each object group in the set of object groups, aggregating attributes represented in objects in the object group into an asset container, in a set of asset containers, representing an asset in the first set of assets in Block S108; accessing a first set of attributes, from a first asset container in the set of asset containers, exhibited by the first asset during the first time interval in Block S114; identifying a first association between the first asset and the second asset based on the first set of attributes in Block S116; accessing a second set of attributes, from a second asset container in the set of asset containers, exhibited by the second asset during the first time interval in Block S118; based on the first association between the first asset and the second asset, associating the first asset with a first subset of attributes in the second set of attributes in Block S120; and defining a first attribute category exhibiting a target combination of attributes in Block S130.

The method S100 also includes, in Block S140, identifying a first asset group, including the first asset, exhibiting the target combination of attributes during the first time interval based on the target combination of attributes represented in: the first set of attributes; and the first subset of attributes, in the second set of attributes, associated with the first asset.

The method S100 further includes: generating a first notification specifying the first asset group in Block S150; and serving the first notification at an operator portal in Block S152.

1.1 Variation: Asset Risk

As shown in FIGS. 1, 2A, 2B, 3A, and 3B, one variation of the method S100 includes: accessing a first set of objects, generated by a set of sources during a first time interval, representing attributes of a first set of assets including a first asset and a second asset in Block S102; partitioning the first set of objects into a first set of object groups in Block S106, each object group in the first set of object groups representing an asset in the first set of assets; for each object group in the set of object groups, aggregating attributes represented in objects in the object group into an asset container, in a set of asset containers, representing an asset in the first set of assets in Block S108; accessing a first set of attributes, from a first asset container in the set of asset containers, exhibited by the first asset during the first time interval in Block S114; identifying a first association between the first asset and the second asset based on the first set of attributes in Block S116; and accessing a second set of attributes, from a second asset container in the set of asset containers, exhibited by the second asset during the first time interval in Block S118.

This variation of the method S100 also includes: based on the first association between the first asset and the second asset, associating the first asset with a first subset of attributes in the second set of attributes in Block S120; calculating a first risk score to the first asset based on the first set of attributes and the first subset of attributes, in the second set of attributes, associated with the first asset in Block S142; and, in response to the first risk score exceeding a risk threshold, executing a first action on the first asset in Block S154.

1.2 Variation: Control Action

As shown in FIGS. 1, 2A, 2B, 3A, 3B, and 4, one variation of the method S100 includes: accessing a set of asset containers representing a set of assets including a first asset and a second asset in Block S108; accessing a first set of attributes, from a first asset container in the set of asset containers, exhibited by the first asset during a first time interval in Block S114; identifying a first association between the first asset and the second asset based on the first set of attributes in Block S116; accessing a second set of attributes, from a second asset container in the set of asset containers, exhibited by the second asset during the first time interval in Block S118; based on the first association between the first asset and the second asset, associating the first asset with a first subset of attributes in the second set of attributes in Block S120; defining a first attribute category exhibiting a target combination of attributes in Block S130; and assigning a first action to the first attribute category in Block S132.

This variation of the method S100 also includes, in Block S140, identifying a first asset group, including the first asset, exhibiting the target combination of attributes during the first time interval based on the target combination of attributes represented in: the first set of attributes; and the first subset of attributes, in the second set of attributes, associated with the first asset.

This variation of the method S100 further includes executing the first action, assigned to the first attribute category, on assets in the first asset group in Block S154.

2. Applications

Generally, a computer system (e.g., a local or remote computer system connected to or interfacing with a computer network) can execute Blocks of the method S100: to aggregate objects from various tools, systems, and other properties during a target time interval; to extract attributes—from these objects—corresponding to each unique asset (e.g., devices, applications, users) in a set of assets affiliated with a computer network and/or an organization; identify relationships between these assets based on the extracted attributes (e.g., devices assigned to a user, applications installed on a device, applications accessed by a user); and correlate attributes between assets based on the identified relationships. The computer system can then execute Blocks of the method S100: to identify an asset group including a subset of assets exhibiting attributes matching a combination of attributes defining the asset group; and automatically execute an action associated with the asset group based on a policy for the asset group.

2.1 Asset Relationships and Risk

More specifically, the computer system can execute Blocks of the method S100: to identify a relationship between a first asset belonging to a first asset class (e.g., device asset class, software asset class, user asset class) and a second asset belonging to a second asset class different from the first asset class; to associate a subset of attributes, for the second asset, with the first asset based on the relationship; and to detect a risk level of the first asset based on a set of attributes for the first asset and the subset of attributes for the second asset. The computer system (and/or an operator portal) can then alert an operator (e.g., security personnel) in response to detecting the risk level of the first asset exceeding a threshold level.

Accordingly, the computer system can identify relationships between a particular asset and a set of related assets of different asset classes; and associate attributes—corresponding to these related assets—with the particular asset. Therefore, the computer system can characterize the particular asset with a more comprehensive and detailed set of attributes with which to compare the particular asset to a security policy or other benchmark.

2.2 Example: Software Vulnerability

In one example, the computer system executes Blocks of the method S100: to extract a first attribute (e.g., from an object published by a first security technology reporting on a laptop device) specifying that an email client is installed on the laptop device; to extract a second attribute (e.g., from an object published by a second security technology reporting on the email client) specifying that the email client exhibits a known vulnerability; to identify a relationship between the laptop device and the email client (i.e., the email client is installed on the laptop device); and to detect that the laptop device is vulnerable based on these attributes.

Accordingly, by identifying relationships between the email client and a set of devices (e.g., the email client installed on the laptop device, the email client installed on a group of desktop computers in an office), the computer system can also identify—in real-time (or near real-time)—the set of devices impacted by the vulnerability exhibited by the email client, thereby enabling an operator to perform timely corrective action on these specific devices and/or enabling the computer system to autonomously perform corrective action to mitigate the vulnerability.

2.4 Example: Search

In another example, the computer system and the operator portal execute Blocks of the method S100: to receive a search query including device, application, and/or user search terms; to identify a subset of assets (e.g., devices, applications, users) exhibiting attributes matching these search terms; and to present a list specifying the subset of assets to an operator. The computer system can also: form an asset group—including the subset of assets—based on the search terms; associate each asset in the asset group with a tag; and/or enforce a security policy associated with the asset group.

Accordingly, the computer system and operator portal can resolve a complex search query for a specific combination of attributes across assets of different asset classes into a set of devices, applications, and/or users exhibiting this specific combination of attributes. Therefore, the computer system can enable flexible and/or fine-grained search capabilities for an operator that is investigating a particular security incident and/or an organization's overall security posture.

2.5 Example: Movement Between Asset Groups

In another example, the computer system executes Blocks of the method S100: to autonomously generate a set of asset groups based on predefined combinations of attributes defining each asset group; to identify a risk level for each asset group based on a respective combination of attributes defining the asset group; and to modify assets within a high risk asset group to cause these assets to exhibit attributes corresponding to a low risk asset group.

Accordingly, the computer system can: group assets into asset groups based on predefined combinations of attributes; associate the asset groups with varying levels of risk based on these combinations of attributes; and identify actions (or actionable prompts for security operators) to move assets from a high-risk asset group to a low-risk asset group based on attributes of these assets and/or policies of these asset groups, thereby reducing an individual risk level for each of these assets—and an overall risk level for the computer network—while complying with a set of policies of an organization.

2.6 Variation: Application Programming Interface

As described herein, the computer system executes the method S100 to serve notifications, query recommendations, query results, and/or other information to (or via) the operator portal. However, the computer system can similarly execute Blocks of the method S100 to serve these notifications, query recommendations, query results, and/or other information to another system via an application programming interface (hereinafter "API").

3. Terminology

Generally, a "search query" is referred to herein as a request—for a subset of assets exhibiting target attributes—including keywords or phrases (e.g., input by an operator at the operator interface, received via an API) representing these target attributes with which to select the subset of assets.

Generally, a "database query" is referred to herein as a set of instructions (e.g., operations) representing the target attributes and executable to identify the subset of assets exhibiting these target attributes.

Generally, an "attribute" is referred to herein as a value defining a property (or characteristic) of an asset.

Generally, an "asset" is referred to herein as a distinct entity (e.g., a physical device, a virtual device, a software application, a user) affiliated with a computer network and/or an organization.

Generally, a "container" is referred to herein as a data structure representing data objects and/or attributes.

4. Asset Identification

Figure 2A:
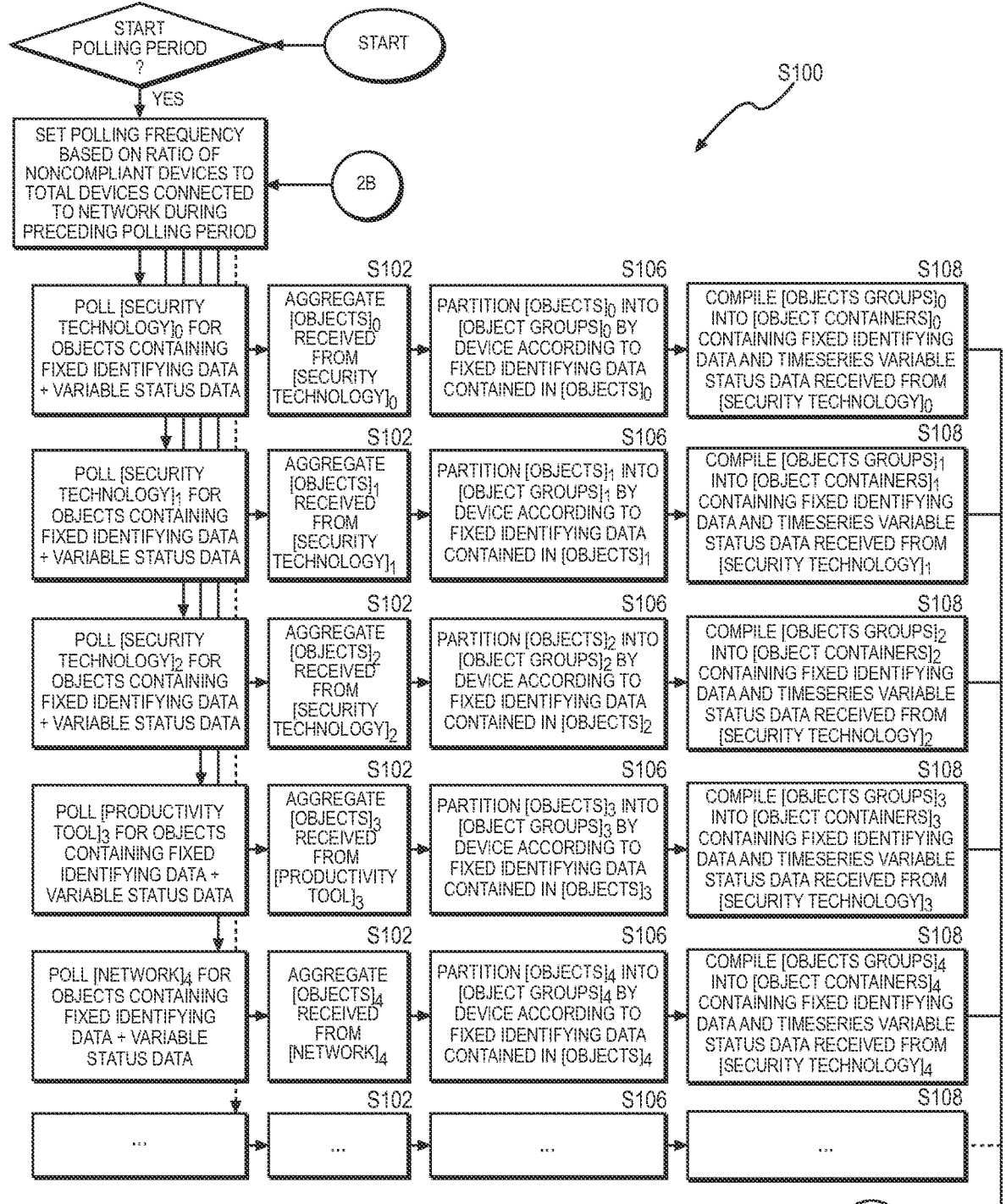
FIGS. 2A and 2B are flowchart representations of one variation of the method.
Figure 2B:
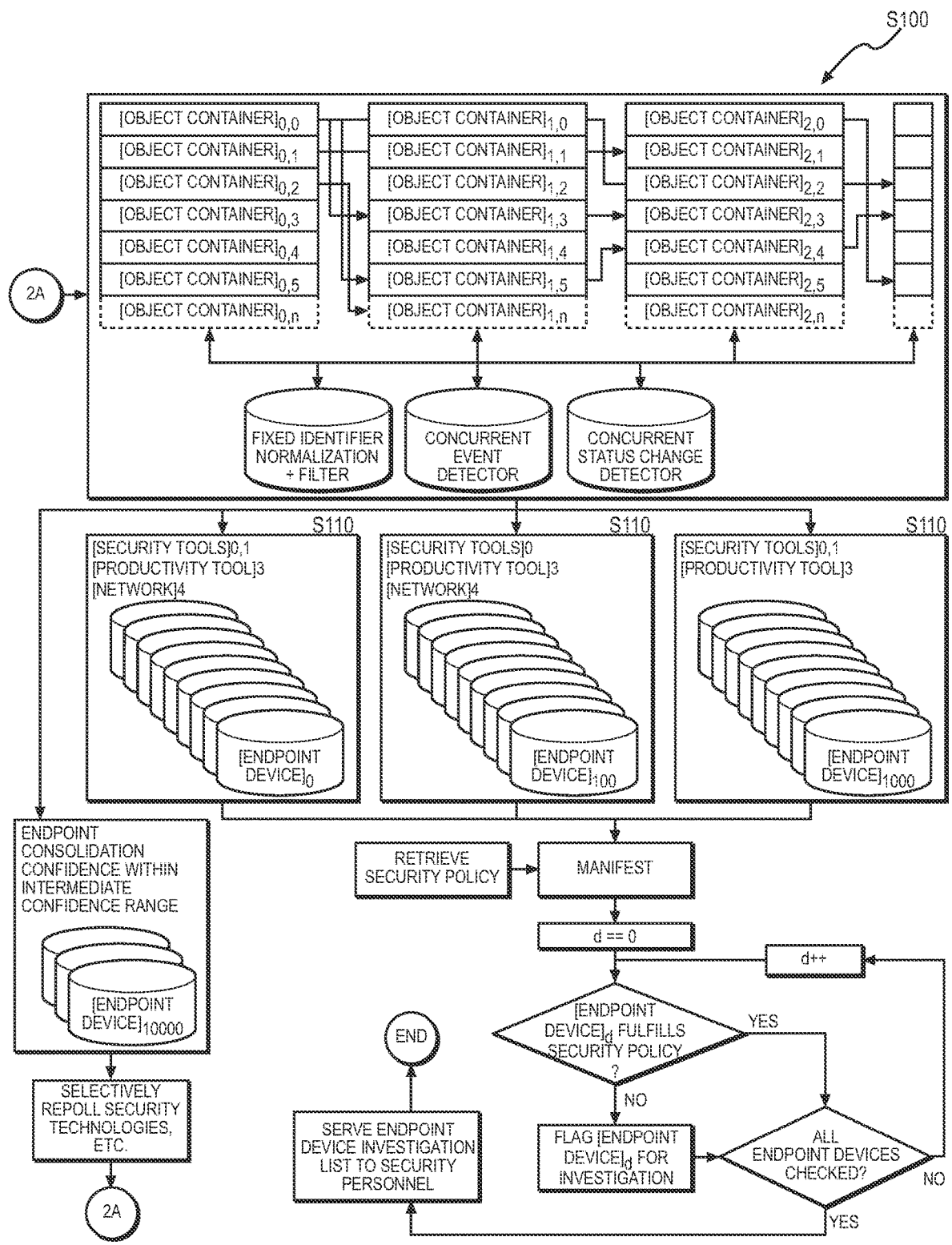

Generally, as shown in FIGS. 1, 2A, and 2B, the computer system can detect and distinguish individual assets (e.g., physical devices, virtual devices, software applications, users)—in a set of assets across a set of asset classes (e.g., a device asset class, a software asset class, a user asset class)—connected to the computer network during discrete intervals, such as by: retrieving a set of objects (and/or registration logs, etc.) published by a set of sources (e.g., security technologies, non-security technologies, human resources management tools, IT helpdesk tools, vulnerability scanners) designated for deployment on the computer network; identifying correspondence between objects (e.g., based on fixed identifying data and/or variable status data); fusing this correspondence into a manifest, for each asset class, containing one identifier for each asset represented in at least one object in this set of objects; and labeling each asset in the manifest with each source—in the set of sources—that published at least one object corresponding to the asset.

For example, the computer system can execute methods and techniques described in U.S. patent application Ser. No. 17/720,163, filed on 13 Apr. 2022, U.S. patent application Ser. No. 18/371,873, filed on 22 Sep. 2023, and U.S. patent application Ser. No. 18/371,891, filed on 22 Sep. 2023, each of which is incorporated in its entirety by this reference, to: compile disparate objects published by various security technologies deployed on devices (e.g., physical devices, virtual devices) connected to the computer network into a first manifest (or "device manifest") for the device asset class; identify all unique devices connected to the computer network during a target time interval (e.g., a past hour); and label each unique device described in the first manifest with an exact combination of tracked security technologies executing on the device during the target time interval (e.g., based on the objects—published by these security technologies during the target time interval—that indicated the device).

The computer system can implement similar methods or techniques to identify and label unique applications into a second manifest (or "application manifest") for the software asset class and to identify and label unique users in a third manifest (or "user manifest") for the user asset class.

4.1 Sources and Objects

Blocks of the method S100 recite: accessing a first set of objects, generated by a set of sources during a first time interval, representing attributes of a first set of assets in Block S102; and partitioning the first set of objects into a first set of object groups in Block S106, each object group in the first set of object groups representing an asset in the first set of assets.

In one implementation, in Block S102, the computer system can access a set of objects, generated by a set of sources during a target time interval (e.g., a first time interval), representing attributes of a set of assets affiliated with a computer network (and/or an organization).

For example, the computer system can: access a first subset of objects—in the set of objects and generated by a first source (e.g., a security technology) in the set of sources during the target time interval—representing attributes of a first subset of assets in the set of assets, including: a first subset of devices affiliated with the computer network during the first time interval; a first subset of applications installed on devices in the first subset of devices; and a first subset of users affiliated with the computer network during the first time interval. Then, the computer system can access a second subset of objects—in the set of objects and generated by a second source (e.g., a human resources management tool) in the set of sources during the target time interval—representing attributes of a second subset of assets, in the set of assets, including: a second subset of devices affiliated with the computer network during the first time interval; a second subset of applications installed on devices in the first subset of devices; and a second subset of users affiliated with the computer network during the first time interval.

In another implementation, in Block S106, the computer system can partition these objects into a set of object groups, each object group in the set of object groups representing a particular asset in the set of assets. For example, the computer system can partition the set of objects into a first object group—in the set of object groups—representing (or associated with) a first asset in the set of assets, each object in the first object group including fixed identifying data and/or variable status data associated with the first asset.

4.2 Asset Containers

Block S108 of the method S100 recites, for each object group in the set of object groups, aggregating attributes represented in objects in the object group into an asset container, in a set of asset containers, representing an asset in the first set of assets.

Generally, the computer system can: partition the set of objects into object groups, each object group corresponding to one asset in Block S108; and, for each object group, aggregate objects in the object group into an asset container (e.g., a "virtual container," a device container, an application container, a user container) including fixed identifying data (e.g., MAC address, operating system) and variable status data (e.g., an IP address, a location) representative of one unique asset in the set of assets in Block S108. More specifically, the computer system can: extract fixed identifying data and variable status data (or "attributes") from objects in an object group—published by different sources and identified by the computer system as corresponding to the same asset—and compile these data into a composite (or "singular") container representing the asset.

For example, the computer system can: detect a first IP address value (e.g., denoted "IP101.23.213.1") corresponding to a first device in a first object published by a first source; detect a second IP address value (e.g., denoted "IP_address_101.23.213.1") corresponding to the first device in a second object published by a second source; correlate the first IP address value and the second IP address value as corresponding to the first device (but in an inconsistent format and lexicon); and normalize the first IP address value and the second IP address value into a normalized IP address value. In this example, the computer system can also: detect a state value—representing a compromised state of the first device—in a third object published by the first source (which may not be captured in objects published by the second source); and detect a user identifier corresponding to the first device in a fourth object published by the second source (which may not be captured in objects published by the first source). The computer system can then compile the normalized IP address value, the state value, and the user identifier into a device container corresponding to the first device.

Accordingly, the computer system can consolidate objects—published by different sources—into one representation of fixed and variable identifying data for each unique asset, including: correlated (and normalized) data that are common across these sources; and raw data that are unique to a single source (and/or that may not be correlatable across multiple sources). Therefore, the computer system can characterize an asset with a complete set of attributes in a consistent format and lexicon.

4.2.1 Asset Attributes

In one implementation, the computer system can generate an asset container specifying attributes (e.g., fixed identifying data, variable status data) representing a corresponding asset during a target time interval. More specifically, the computer system can generate a first asset container in a set of asset containers, the first asset container including objects in a first object group (e.g., an object group associated with a first asset in a set of assets) and representing attributes of the first asset.

In one example, the computer system generates a first device container specifying a first set of device attributes (e.g., a device name, an operating system, a MAC address, an IP address, a group(s), a tag(s)) representing a first device in a set of devices.

In another example, the computer system generates a first application container specifying a first set of application attributes (e.g., an application name, an application version, a vendor, vulnerabilities, a group(s), a tag(s)) representing a first application in a set of applications.

In another example, the computer system generates a first user container specifying a first set of user attributes (e.g., a name, a login username, an employee identifier, a phone number, an email address, a latest password change, a role, a group(s), a tag(s)) of a first user in a set of users.

Generally, the computer system can store a set of asset containers in a data repository (or a set of data repositories) for storing attributes characterizing a set of assets.

4.2.2 Attribute Data Types

Generally, the computer system can aggregate an attribute—representing an asset—into an asset container based on a data type of the attribute.

In one implementation, for a first set of attributes exhibited by a first asset during a target time period, the computer system can: identify a first subset of attributes, in the first set of attributes, exhibiting a first data type (e.g., a string data type); and aggregate (or store) the first subset of attributes in a first subcontainer (e.g., a first table) in a first asset container corresponding to the first asset.

Then, the computer system can: identify a second subset of attributes, in the first set of attributes, exhibiting a second data type (e.g., an integer data type); and aggregate the second subset of attributes in a second subcontainer (e.g., a second table) in the first asset container.

The computer system can repeat the foregoing methods and techniques, for each data type in a set of data types (e.g., a string data type, an integer data type, a timestamp data type, a float data type, a byte data type, a Boolean data type), to: identify a subset of attributes, in the first set of attributes, exhibiting the data type; and aggregate this subset of attributes in a separate subcontainer in the first asset container.

Accordingly, there computer system can aggregate attributes—exhibiting different data types—in separate subcontainers within an asset container, thereby enabling the computer system to rapidly index the asset container according to a data type while preserving behavior (e.g., range matching, collation) of the data type.

4.2 Asset Manifest

Block S110 of the method S100 recites: generating a first manifest of assets during the first time interval based on a first subset of asset containers in the set of asset containers; and generating a second manifest of assets during the first time interval based on a second subset of asset containers in the set of asset containers.

Generally, in Blocks S110 and S112, the computer system can fuse a set of asset containers—derived from isolated, internal objects published by disconnected sources—into one manifest identifying all unique assets, characterized by a particular asset class, connected to the computer network during the target time interval. Based on fixed identifying data and variable status data contained in asset containers in the set of asset containers, the computer system can: generate a manifest (or "aggregation") of assets affiliated with the computer network during the target time interval in Block Silo; and label each asset in the manifest with a set of attributes exhibited by the asset during the target time interval based on a corresponding asset container in the set of asset containers in Block S112. For example, the computer system can label a first asset in the manifest with a first set of attributes exhibited by the first asset during the target time interval based on fixed identifying data and/or variable status data—attributed to the target time interval—contained in a first asset container representing the first asset.

In one implementation, the computer system can: generate a device manifest representing unique devices—characterized by the device asset class—connected to the computer network during a target time interval; and label each unique device in the device manifest with a set of attributes (or a subset of attributes) exhibited by the device during the target time interval.

In another implementation, the computer system can: generate a user manifest representing unique users—characterized by the user asset class—affiliated with the computer network during the target time interval; and label each unique user in the user manifest with a set of attributes (or a subset of attributes) exhibited by the user during the target time interval.

In yet another implementation, the computer system can: generate an application manifest representing unique applications—characterized by the software asset class—installed on devices connected to the computer network during the target time interval; and label each unique application in the application manifest with a set of attributes (or a subset of attributes) exhibited by the application during the target time interval.

4.2.1 Asset Manifest Update

The computer system can repeat the foregoing methods and techniques to update each manifest with assets—and their attributes—connected to the computer network over time, such as once per hour, twice per day, or daily.

5. Asset Associations

Blocks of the method S100 recite: accessing a first set of attributes, from a first asset container in the set of asset containers, exhibited by the first asset during the first time interval in Block S114; and identifying a first association between the first asset and the second asset based on the first set of attributes in Block S116.

Figure 3A:
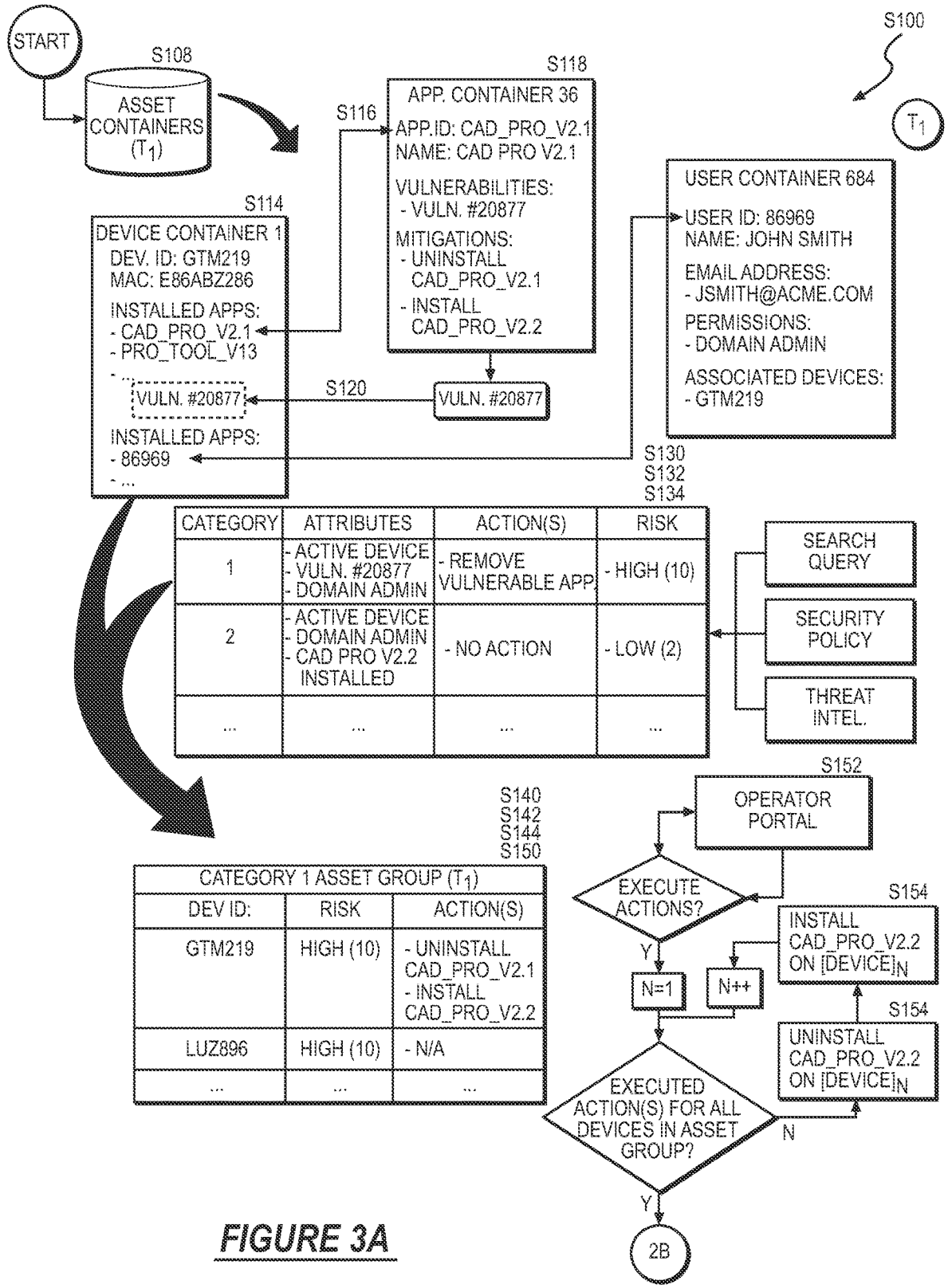
FIGS. 3A and 3B are flowchart representations of one variation of the method.

Generally—as shown in FIG. 3A—in Blocks S108, S114, and S116, the computer system can access (or generate), for a particular asset in a set of assets, an asset container specifying attributes representing the particular asset in relation to other assets, in the set of assets, during a target time interval. More specifically, the computer system can access the asset container further specifying attributes representing the particular asset (e.g., a device)—characterized by one asset class (e.g., the device asset class)—in relation to another asset (e.g., an application, a user) characterized by a different asset class (e.g., the software asset class, the user asset class). Then, the computer system can: identify (or generate) a set of associations (or "relationships") between the particular asset and other assets; and store this set of associations in the asset container and/or in another data structure (e.g., a relationship container for the particular asset, a database storing sets of associations for the set of assets).

In one implementation, in Block S114, the computer system can access a set of attributes, from an asset container in the set of asset containers, exhibited by a first asset (e.g., a first device) in a set of assets, the set of attributes including a subset of attributes related to a second asset (e.g., a first application, a first user)—characterized by a second asset class (e.g., the software asset class, the user asset class)—in the set of assets. In Block S116, based on the subset of attributes related to the second asset, the computer system can: identify an association between the first asset and the second asset; and store the association in the asset container.

In one example, the computer system accesses the first set of attributes—exhibited by a first device—including: a first subset of attributes related to assets characterized by the software asset class, such as a first attribute representing an application identifier of a first application installed on the first device; and a second subset of attributes related to assets characterized by the user asset class, such as a second attribute representing a username of a first user that logged in to the first device. In this example, the computer system: identifies a first association between the first device and the first application based on the first attribute; identifies a second association between the first device and the first user based on the second attribute; and stores the first association and the second association in a first asset container corresponding to the first device. The computer system can identify associations between the first device and other assets based on other attributes, such as attributes representing: applications installed and/or accessed on the first device; application activity on the first device; usernames that have logged in to the first device; user activity on the first device; etc.

In another example, the computer system accesses a second set of attributes—exhibited by a second application—including: a third subset of attributes related to assets characterized by the device asset class (e.g., devices on which the first application is installed and/or accessed, devices allocated a license to the first application); and a fourth subset of attributes related to assets characterized by the user asset class (e.g., usernames that have accessed the first application during a target time interval, email addresses allocated a license to the first application). In this example, the computer system: identifies a first set of associations between the second application and assets (e.g., devices on which the second application is installed or accessed, users accessing the second application), in the set of assets, based on the third subset of attributes and/or the fourth subset of attributes; and stores the first set of associations in a second asset container corresponding to the second application.

In another example, the computer system accesses a third set of attributes—exhibited by a third user—including: a fifth subset of attributes related to assets characterized by the device asset class (e.g., devices assigned to the third user, devices accessed by the third user); and a sixth subset of attributes related to assets characterized by the software asset class (e.g., applications accessed by the third user, application licenses allocated to the third user). In this example, the computer system: identifies a second set of associations between the third user and assets (e.g., devices accessed by and/or assigned to the third user, applications accessed by the third user), in the set of assets, based on the fifth subset of attributes and/or the sixth subset of attributes; and stores the second set of associations in a third asset container corresponding to the third user.

5.1 Time-Based Relationship Risk

In one implementation, the computer system can track changes in a set of associations for a particular asset during a time period (e.g., a time period spanning a set of time intervals). In this implementation, the computer system can detect a risk attribute for the particular asset based on the changes to the set of associations during the time interval.

In one example, the computer system detects that a number of installed applications on a first device steadily increases from ten applications to twenty applications over ten time intervals (or a rate of change of one application per time interval). In this example, the computer system characterizes the first device as low risk in response to detecting the rate of change falling below a threshold (e.g., five applications per time interval). Additionally, the computer system can; generate a first trendline depicting the number of installed applications on the first device over the ten time intervals; and serve the first trendline at the operator portal.

In another example, the computer system detects that a number of installed applications on a second device is ten applications over nine time intervals and then increases from ten applications to twenty applications during a tenth time interval (or a rate of change of ten applications per time interval). In this example, in response to detecting the rate of change exceeding the threshold, the computer system can: characterize the second device as high risk; and selectively prompt security personnel to investigate the second device, the installed applications on the second device, and/or a user (or set of users) assigned to the second device. Additionally, the computer system can: generate a second trendline depicting the number of installed applications on the second device over the ten time intervals; and serve the second trendline at the operator portal.

Accordingly, the computer system can: detect changes in a set of associations between an asset (characterized by one asset class) and other assets (characterized by other asset classes) over time; and characterize a level of risk for the asset based on these changes (e.g., based on a rate of change of these changes), thereby exposing potential vulnerabilities in a computer network including many inter-related assets across a variety of asset classes.

6. Cross-Asset Data Model

Blocks of the method S100 recite: accessing a second set of attributes, from a second asset container in the set of asset containers, exhibited by the second asset during the first time interval in Block S118; and, based on the first association between the first asset and the second asset, associating the first asset with a first subset of attributes in the second set of attributes in Block S120.

In one implementation, in response to identifying an association between a first asset and a second asset based on a first set of attributes exhibited by the first asset during a target time interval, the computer system can: access a second set of attributes—exhibited by the second asset during the target time interval—from a second asset container corresponding to the second asset in Block S118; and associate the second set of attributes (or a subset of attributes in the second set of attributes) with the first asset in Block S120.

In one example, the computer system: identifies a first association between a first device and a first application; accesses a second set of attributes within a second container representing the first application; and associates the second set of attributes with the first device. More specifically, the computer system can: identify a first attribute, in a first set of attributes exhibited by the first device, representing the first application installed on the first device; identify a second attribute, in the second set of attributes, representing presence of a known vulnerability in the second application; and associate the second attribute—representing presence of the known vulnerability in the second application—with the first device.

Therefore, based on the first association between the first device and the first application, the computer system can detect that the first device exhibits the known vulnerability based on the first attribute and the second attribute.

Additionally, the computer system can aggregate the second attribute into (or link the second attribute to) the first set of attributes and/or a first asset container representing the first device.

In another example, the computer system: identifies a second association between a first user and the first application; accesses the first set of attributes within a first asset container representing the first device; and associates the first set of attributes with the first user. More specifically, the computer system can: identify a third attribute, in a third set of attributes exhibited by the first user, representing assignment of the first device to the first user; identify the second attribute—representing presence of the known vulnerability in the second application—associated with the first device; and associate the second attribute with the first user.

Therefore, based on the second association between the first user and the first device, the computer system can detect that the first user exhibits increased risk exposure based on the second attribute and the third attribute.

Accordingly, the computer system can: identify relationships between a particular asset and related assets characterized by different asset classes; and associate attributes—corresponding to these related assets—with the particular asset. Therefore, the computer system can characterize the particular asset with a more comprehensive and detailed set of attributes.

7. Attribute Categories and Asset Groups

Blocks of the method S100 recite: defining a first attribute category exhibiting a target combination of attributes in Block S130; and identifying a first asset group exhibiting the target combination of attributes during the first time interval in Block S140.

Blocks of the method S100 recite: generating a first notification specifying the first asset group in Block S150; and serving the first notification at an operator portal in Block S152.

Generally, in Blocks S130 and S140, the computer system can: define an attribute category representing (or exhibiting) a combination of attributes; and identify an asset group including all unique assets exhibiting this combination of attributes during a target time interval.

In one implementation, in Block S130, the computer system can initialize a set of attribute categories, each attribute category exhibiting one combination of attributes. Each attribute category can therefore represent a possible "condition" of an asset on the computer network.

The computer system can then: prompt an operator to select a target or nominal time, such as the current time or a time of a known attack or security threat on the computer network; and calculate a frequency (or "count") of assets with attributes that correspond to (or "match") each attribute category at the target time. More specifically, for each attribute category, and therefore for each combination of attributes, the computer system can: query the manifest (and/or the set of asset containers) for a count of assets that contain all attributes of the attribute category during the target time; and store this count and target time for the attribute category.

In this implementation, the computer system can present, at an operator portal, a list of the set of attribute categories specifying, for each attribute category in the set of attribute categories, the count of assets for the attribute category for the target time interval.

In another implementation, in Block S140, the computer system can: query the manifest and/or the set of asset containers for assets exhibiting (or associated with) all attributes in a target combination of attributes of an attribute category; and identify a group of assets (or an "asset group") exhibiting the target combination of attributes during a target time interval.

For example, the computer system can access an attribute category exhibiting a target combination of attributes including: a first subcombination of attributes associated with assets characterized by a first asset class (e.g., the device asset class); and a second subcombination of attributes associated with assets characterized by a second asset class (e.g., the software asset class). The computer system can: access a first set of attributes exhibited by a first asset (e.g., a first device characterized by the device asset class) during the target time interval; access a first subset of attributes—exhibited by a second asset (e.g., a first application characterized by the software asset class) during the target time interval—associated with the first asset based on a first association between the first asset and the second asset (e.g., the first device includes the first application installed thereon); detect a second subset of attributes, in the first set of attributes exhibited by the first asset during the target time interval, corresponding to the first subcombination of attributes in the target combination of attributes; and detect a third subset of attributes, in the first subset of attributes associated with the first asset, corresponding to the second subcombination of attributes in the target combination of attributes In this example, the computer system can identify an asset group—including the first asset—exhibiting the target combination of attributes during the first time interval based on the target combination of attributes represented in: the first set of attributes; and the first subset of attributes associated with the first asset.

Accordingly, the computer system can identify a particular asset—characterized by a particular asset class—as belonging to an asset group exhibiting a target combination of attributes based on: a set of attributes exhibited by the particular asset during a target time interval; and attributes associated with the particular asset based on relationships between the particular asset and other assets characterized by different asset classes.

The computer system can then: generate a notification specifying the asset group (e.g., a list of assets in the asset group) in Block S150; and serve the notification to (or via) the operator portal in Block S152.

7.1 Action Assignment

Block S132 of the method S100 recites assigning a first action to the first attribute category.

In one implementation, in Block S132, the computer system can assign an action (or a set of actions) to an attribute category.

For example, the computer system can interface with the user via the operator portal (e.g., executing on a local computing device) to directly assign actions to attribute categories or characterize risk of an asset in these attribute categories to the computer network.

8. Cross-Asset Search

Generally, the operator portal can interface with an operator to receive a search query specifying multiple device, application, and/or user search terms, such as "Show me all Windows devices that are assigned to a user whose latest password change occurred more than one year ago and that have vulnerable installed applications."

In one implementation, the computer system can define an attribute category based on the search query received from the operator portal. More specifically, the computer system can receive a search query, from the operator portal (or an API), specifying the target combination of attributes based on the search terms.

Because the computer system links the manifest(s), the device containers, the application containers, the user containers, and/or other data structures (e.g., relationship containers, database(s) storing sets of associations) as described above, the computer system can then scan the manifest(s), the device container(s), the application container(s), the user container(s), and/or other data structures for these values and return a list of unique devices, unique applications and/or unique users that fulfill these terms. The operator portal can then present this list to the operator. Additionally, the operator portal can present attributes and/or associations for each of device, application, and/or user included in the list.

Accordingly, the computer system and operator portal can resolve a complex search query for a specific combination of attributes across assets of different asset classes (e.g., devices, applications, users) into a set of devices, applications, and/or users exhibiting (or associated with) this specific combination of attributes. Therefore, the computer system can enable flexible and/or fine-grained search capabilities for an operator that is investigating a particular security incident and/or an organization's overall security posture.

8.1 Queries

Figure 4:
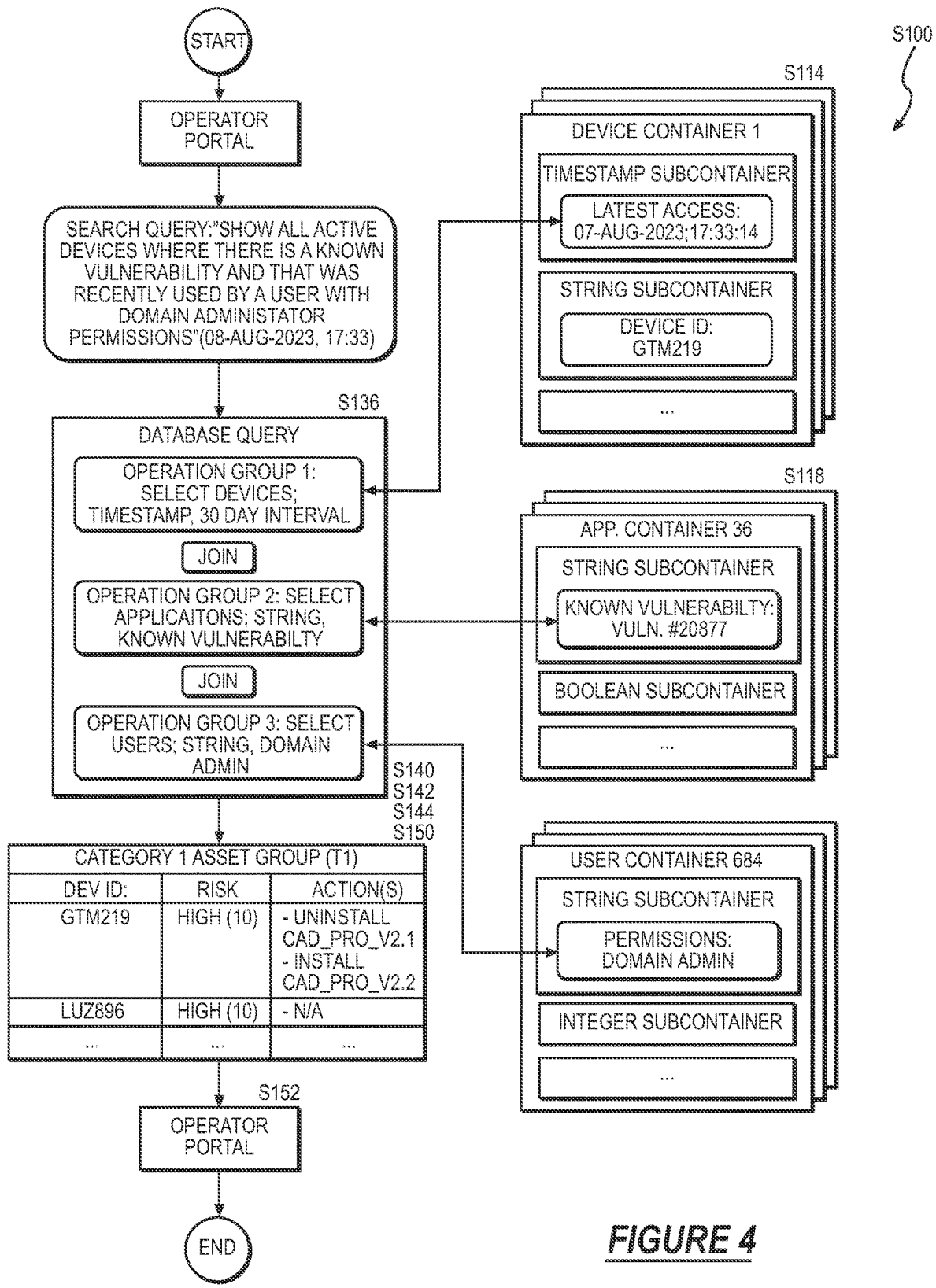
FIG. 4 is a flowchart representation of one variation of the method.

Generally—as shown in FIG. 4—in Blocks S136 and S140, the computer system can: receive a search query (e.g., from the operator portal, via an API) specifying a target combination of attributes; generate a database query including a set of operations representing the target combination of attributes; and execute the database query on the set of asset containers and/or the manifest(s). The computer system can identify an asset group—exhibiting the target combination of attributes—in response to executing the database query.

In one implementation, the computer system can receive a search query specifying a target combination of attributes—during a target time interval—including: a first subcombination of attributes associated with assets characterized by the device asset class; a second subcombination of attributes associated with assets characterized by the software asset class; and/or a third subcombination of attributes associated with assets characterized by the user asset class.

In Block S136, the computer system can generate a database query including a set of operations representing the target combination of attributes during the target time interval. More specifically, the computer system can generate a database query including: a first operation (or a first subset of operations) representing the first subcombination of attributes; a second operation (or a second subset of operations) representing the second subcombination of attributes; and a third operation (or a third subset of operations) representing the second subcombination of attributes.

For example, the computer system can generate the database query including a first operation representing a first attribute, in the target combination of attributes, exhibiting the string data type. In this example, the computer system can execute the database query—including the first operation—on a first subcontainer (e.g., a first table) in a first asset container corresponding to a first asset, the first subcontainer storing attributes, corresponding to the first asset, exhibiting the string data type. The computer system can execute the database query including other operations (e.g., the second operation, the third operation) in the set of operations to identify an asset group exhibiting the target combination of attributes during the target time interval.

In this implementation, in response to executing this database query, the computer system can: identify a first subset of devices (e.g., in the device manifest) exhibiting the first subcombination of attributes during the target time interval, such as the first asset; identify a second subset of applications (e.g., in the application manifest) exhibiting the first subcombination of attributes during the target time interval, such as a second asset; and identify a third subset of users (e.g., in the user manifest) exhibiting the first subcombination of attributes during the target time interval. More specifically, the computer system can: identify the second subset of applications further exhibiting an association with devices in the first subset of devices; and identify the third subset of users further exhibiting an association with devices in the first subset of devices.

In response to executing the database query, the computer system can identify an asset group including the first subset of devices based on the second subset of applications and the third subset of users. More specifically, the computer system can identify the asset group including the first subset of devices exhibiting associations with the applications in the second subset of applications and/or associations with users in the third subset of users, such as a first association between the first asset and the second asset. Additionally or alternatively, the computer system can identify the asset group including the first subset of devices based on associations between applications in the second subset of applications and users in the third subset of users.

8.2 Actions

In one implementation, the computer system can: receive a search query specifying a target combination of attributes; and define an attribute category exhibiting the target combination of attributes.

Additionally, the computer system can: receive an action (or a set of actions)—from the operator portal—corresponding to the search query; and assign the action to the attribute category.

For example, in response to receiving the search query from the operator portal, the computer system can prompt an operator to enter an action (or a set of actions) corresponding to the search query. The computer system can receive the action, such as: no action (e.g., omitting an action assignment); a low-urgency alert; a high-urgency alert; quarantine with low-urgency alert; removal of an asset; etc.

Then, the computer system can execute the foregoing methods and techniques to identify an asset group exhibiting the target combination of attributes during a target time interval. In response to identifying the asset group, the computer system can execute the action, assigned to the attribute category, on assets in the asset group.

8.3 Example: Search Query, Database Query, and Identified Asset Group

In one example, the computer system receives a search query at the operator portal, the search query specifying, "Show all active devices where there is a known vulnerability and that was recently used by a user with Domain Administrator permissions." In response to receiving the search query, the computer system defines a first attribute category exhibiting a first target combination of attributes during a first time interval (e.g., the last 30 days). More specifically, the computer system can define the first attribute category exhibiting the first target combination of attributes including: a first subcombination of attributes—associated with assets (e.g., devices) in the device asset class—including a first attribute representing an active status within the last 30 days; a second subcombination of attributes, associated with assets (e.g., applications) in the software asset class, including a second attribute representing presence of a known vulnerability; and a third subcombination of attributes, associated with assets (e.g., users) in the user asset class, including a third attribute representing Domain Administrator permissions.

Then, the computer system generates a database query including a set of operations (e.g., select operation(s), join operation(s))—representing the target combination of attributes—such as: a first subset of operations representing the first subcombination of attributes; a second subset of operations representing the second subcombination of attributes; and a third subset of operations representing the third subcombination of attributes.

Additionally, the computer system can generate the database query including the set of operations further representing: associations between the devices in the device asset class and applications in the software asset class, such as an association representing an application installed on a device during the first time interval; and associations between the devices in the device asset class and users in the user asset class, such as an association representing a user access on a device during the first time interval.

In response to executing the database query, the computer system: identifies a first subset of devices (e.g., a first device) exhibiting the first attribute representing the active status within the last 30 days; identifies a second subset of applications (e.g., a first application) exhibiting the second attribute representing presence of the known vulnerability; and identifies a third subset of users (e.g., a first user) exhibiting the third attribute representing Domain Administrator permissions.

More specifically, the computer system can: identify the second subset of applications further exhibiting associations with devices in the first subset of devices; and identify the third subset of users further exhibiting associations with devices in the first subset of devices.

In response to executing the database query, the computer system can identify a first asset group including the first subset of devices based on the second subset of applications and the third subset of users.

In this example, the computer system can identify the first asset group—including the first device—in response to: identifying the first subset of devices including the first device; identifying the second subset of applications including the first application; and identifying a first association, between the first device and the first application, representing the first application installed on the first device during the first time interval.

Additionally, the computer system can identify the first asset group—including the first device—in response to: identifying the first subset of devices including the first device; identifying the third subset of users including the first user; and identifying a second association, between the first device and the first user, representing access by the first user on the first device during the first time interval.

The computer system can then: generate a notification specifying the first asset group, such as a first list of assets—including the first device—in the first asset group; and serve the notification to the operator portal responsive to the search query.

8.3.1 Example: Action and Attribute Update

In another example, the computer system can assign a first action—including removing an application, exhibiting a known vulnerability, from a device—to the first attribute category.

In response to identifying the first asset group, the computer system can execute the first attribute on assets in the first asset group. More specifically, the computer system can remove (e.g., uninstall, delete) the first application from the first device in response to identifying the first asset group including the first device.

Accordingly, the computer system can: correlate a vulnerable application with a group of devices based on attributes associated with the vulnerable application and exhibited by devices in the group of devices; and remove the vulnerable application from the group of devices. Therefore, the computer system can: detect presence of a vulnerability on the group of devices (e.g., including the first device) absent direct reporting of the vulnerability on these devices by a vulnerability scanner or other technology; and remediate the vulnerability by removing the application from these devices.

In this example, in response to removing the first application from the first device, the computer system can: execute the database query, including the set of operations representing the target combination of attributes, for a second time interval succeeding the first time interval; and identify a second asset group—excluding the first device—exhibiting the target combination of attributes during the second time interval.

More specifically, the computer system can execute the foregoing methods and techniques: to access a second set of objects, generated by the set of sources during a second time interval succeeding the first time interval, representing attributes of a second set of assets including the first device and the first application; to partition the second set of objects into a second set of object groups, each object group in the second set of object groups representing an asset in the second set of assets; to, for each object group in the set of object groups, aggregate attributes represented in objects in the object group into an asset container, in the set of asset containers, representing an asset in the second set of assets; and to access a third set of attributes, from a first asset container corresponding to the first device, exhibited by the first device during the second time interval, and remove the first association between the first device and the first application based on the third set of attributes. In particular, the computer system: accesses the third set of attributes including an attribute representing a second set of applications—installed on the first device during the second time interval, the second set of applications—excluding the first application; and removes the first association between the first device and the first application in response to absence of the first application from the second set of applications in Block S122.

Then computer system: generates a second notification specifying the second asset group, such as a second list of assets—excluding the first device—in the second asset group; and serves the second notification to the operator portal.

8.4 Additional Search Terms and Recommended Search Queries

Generally, the computer system can recommend additional search terms (e.g., within a search bar of the operator portal) to append to a search query.

In one implementation, the computer system can recommend additional search terms based on historical search queries. For example, the computer system can track a set of search queries during a predefined time period (e.g., past day, past week, past month); and recommend search terms based on a frequency of a search query (or a subset of terms within a search query) in the set of search queries exceeding a threshold (e.g., ten search queries, 5% of all search queries).

In another implementation, the computer system can: store a set of critical search queries (and/or critical clusters of search terms); and recommend additional search terms to append to a search query based on the set of critical search queries. For example, the computer system can store "latest password change" and/or "vulnerable installed application" as critical clusters of search terms; and recommend these critical clusters of search terms to append to a search query.

In another implementation, the computer system can: aggregate a corpus of search queries, received from a set of organizations, specifying combinations of attributes; calculate a first quantity of search queries, in the corpus of search queries, specifying a first combination of attributes; and, in response to the first quantity of search queries exceeding a first threshold quantity (e.g., ten search queries, 5% of all search queries), store the first combination of attributes as a recommended search query. More specifically, in response to the first quantity of search queries exceeding the first threshold quantity, the computer system can: define a first attribute category exhibiting the first combination of attributes; and store the first attribute category. Then, the computer system can: generate a notification specifying the recommended search query; and serve the notification to the operator portal.

In one implementation, the computer system can receive the corpus of search queries from the set of organizations including subsets of organizations, each subset of organizations exhibiting a different organization type (e.g., healthcare, finance, government, defense, education). In this implementation, in response to the first quantity of search queries exceeding a second threshold quantity for a first organization type (e.g., 5% of all search queries received from healthcare organizations), the computer system can: store the first combination of attributes as a recommended search query for organizations exhibiting the first organization type (e.g., healthcare organizations); generate the notification specifying the recommended search query; and serve the notification to the operator portal.

8.5 Tagged Asset Group

Additionally, in response to generating the list of unique devices, unique applications, and/or unique users that fulfill the terms within a search query, the computer system can: generate an asset group including the devices, applications, users, and/or data in the list; and associate this asset group with a tag.

For example, in response to a search query specifying "Show me all Windows devices that are assigned to a user whose latest password change was over a year ago and that have vulnerable installed applications," the computer system can generate a list specifying a set of devices matching these search terms. More specifically, the computer system can generate the list specifying a set of Windows devices: assigned to a set of users exhibiting a duration since a latest password change exceeding one year; and including a set of vulnerable applications installed thereon. The computer system can then generate an asset group including this set of Windows devices and associate the group with a first tag in a set of tags. In this example, the computer system can add the first tag (e.g., an attribute representing the first tag) to a respective device container for each device in the asset group. Additionally, the computer system can similarly add the first tag to: a respective application container for each application in the set of vulnerable devices; and/or a respective user container for each user in the set of users.

Accordingly, the computer system can form and tag asset groups exhibiting combinations of attributes specified by an operator, thereby enabling the operator to monitor the asset group, generate a security policy for the asset group, and/or perform corrective action to place the asset group in compliance with the security policy.

9. Security Policy

Generally, the computer system can: access (or generate) a security policy that defines rules for configurations and/or combinations of attributes for an asset group; compare these rules to attributes of assets—in the asset group—recorded in the current manifest(s) and/or asset containers; and selectively prompt security personnel to investigate these assets.

For example, in response to detecting that a first device in the asset group deviates from a rule defined in the security policy—such as in response to detecting that the first device includes a first installed application exhibiting a vulnerability and/or in response to detecting assignment of the first device to a first user exhibiting a duration, since a latest password change, exceeding one year—the computer system can prompt security personnel to: investigate the first device, the first application, and/or the first user; push an update to the first device; prompt the first user for a password change; and/or limit account or user permissions of the first user until the security policy is fulfilled.

In one implementation, the computer system can access a first security policy defining a first rule representing remediation (or mitigation) of vulnerable applications installed on active devices accessed by a user with Domain Administrator permissions. More specifically, the computer system can access the first security policy defining a first combination of attributes including: a first subcombination of attributes—associated with assets (e.g., devices) in the device asset class—including a first attribute representing an active status within the last 30 days; a second subcombination of attributes, associated with assets (e.g., applications) in the software asset class, including a second attribute representing presence of a known vulnerability; and a third subcombination of attributes, associated with assets (e.g., users) in the user asset class, including a third attribute representing Domain Administrator permissions.

Additionally, the computer system can access the first security policy further defining a first action—such as quarantine, removal of an application, restriction of user permissions, notification to an operator, etc.—responsive to an asset exhibiting attributes corresponding to the first combination of attributes.

Then, based on the first security policy, the computer system can: define a first attribute category exhibiting the first combination of attributes in Block S130; and assign the first action to the first attribute category in Block S132.

9.1 Threat Intelligence

In one implementation, the computer system accesses a threat intelligence stream specifying asset attributes correlated with security threats detected on other computer networks (and/or the computer network). Upon receipt of a threat intelligence for a recently identified security threat, the computer system extracts a set of attributes, a risk level, and/or a best-practice action from the threat intelligence, such as by: implementing natural language processing techniques to automatically extract these parameters; and implementing methods and techniques similar to those described above to reconcile these parameters to attribute categories and specific attributes of assets connected to the computer network.

Alternatively, upon receipt of a threat intelligence for a recently identified security threat, the computer system can prompt the operator to review and manually enter a combination of attributes, a risk level, and/or an action (e.g., alert, quarantine) indicated by the threat intelligence, such as by matching these parameters in the threat intelligence to attribute categories and specific attributes of assets connected to the computer network.

In this implementation, the computer system can then: identify a subset of (i.e., one or more) attribute categories—such as described above—that contain all attributes derived from the threat intelligence; label these attribute categories as risky conditions; and assign corresponding actions extracted from the threat intelligence or entered manually by the user to these attribute categories.

Therefore, the computer system can map a threat intelligence for a security threat detected on another network onto an attribute category representing a combination of attributes in order to automatically create or update a new condition-action pair for the computer network based on characteristics of assets involved in security attacks on other computer networks.

10. Auto-Grouping

Generally, the computer system can autonomously identify (or generate) an asset group based on a combination of attributes defining the asset group. The computer system can then implement similar methods and techniques described above to monitor the asset group, generate a security policy for the asset group, and/or perform corrective action to place the asset group in compliance with the security policy.

In one implementation, the computer system can: access a predefined set of combinations of attributes; and, for each combination of attributes in the set of combinations of attributes, generate a respective asset group based on the respective combination of attributes. More specifically, the computer system can: scan the manifest(s), the device container(s), the application container(s), and/or the user container(s), for these combinations of attributes; and generate a set of asset groups, each asset group in the set of asset groups exhibiting a respective combination of attributes in the set of combinations of attributes. Additionally, the computer system can add a tag to a respective asset container for each asset included in an asset group.

In another implementation, the computer system can: access a combination of attributes of a second set of assets associated with a prior security breach; generate an asset group—in a first set of assets—based on this combination of attributes; generate a security policy for the asset group; and perform corrective action to place the asset group in compliance with the security policy. Therefore, the computer system can leverage characteristics of previous attacks (on a second set of assets) to preempt an attack on a computer network including a first set of assets.

11. Asset Group Risk

Blocks of the method S100 recite: assigning a risk level to the first attribute category in Block S134; and calculating a first risk score to the first asset based on the first set of attributes and the first subset of attributes, in the second set of attributes, associated with the first asset in Block S142.

Generally, the computer system can characterize a risk level for an asset group based on a combination of attributes (or sub-combination of attributes) defining the asset group. In one example, the computer system can characterize a first asset group as a "high risk" asset group based on a first combination of attributes—defining the first asset group—including an attribute associated with a high risk level (e.g., a vulnerable application, a compromised login password, a detected breach). In another example, the computer system can characterize a second asset group as a "low risk" asset group based on a second combination of attributes—defining the second asset group—excluding any attributes associated with the high risk level.

In one implementation, in Block S134, the computer system can assign a risk level (or risk score) to an attribute category exhibiting a target combination of attributes. More specifically, the computer system can assign the risk level to the attribute category based on attributes in the target combination of attributes.

In one example, the computer system: receives the target combination of attributes and the risk level from the operator portal (or API); defines the attribute category representing the target combination of attributes; and assigns the risk level to the attribute category.

In another example, the computer system: accesses a security policy defining the target combination of attributes and the risk level; defines the attribute category representing the target combination of attributes; and assigns the risk level to the attribute category.

In another example, the computer system: extracts the target combination of attributes and the risk level from a threat intelligence; defines the attribute category representing the target combination of attributes; and assigns the risk level to the attribute category.

In another implementation, the computer system can execute the foregoing methods and techniques: to access a first set of attributes exhibited by a first asset during a first time interval; to access a second set of attributes exhibited by a second asset during the first time interval; to associate the first asset with a first subset of attributes in the second set of attributes based on a first association between the first asset and the second asset; and to identify a first asset group—including the first asset—exhibiting the target combination of attributes during the first time interval. More specifically, the computer system can identify the first asset group including the first asset based on the target combination of attributes represented in: the first set of attributes; and the first subset of attributes, in the second set of attributes, associated with the first asset.

In this implementation, in response to identifying the asset group exhibiting the target combination of attributes, the computer system can calculate (or assign) a risk level (or score) to assets—in the asset group—based on the risk level assigned to the attribute category in Block S142. More specifically, the computer system can calculate the risk score to the first asset based on: the risk level assigned to the attribute category; and/or the target combination of attributes represented in the first set of attributes and the first subset of attributes, in the second set of attributes, associated with the first asset.

In one example, the computer system: assigns a first risk level (e.g., a "high" risk level, a "low risk level") to a first attribute category exhibiting the first combination of attributes; and, for each asset in a first asset group exhibiting the first combination of attributes, assigns the first risk level to the asset. Alternatively, for each asset in a first asset group exhibiting the first combination of attributes, the computer system can calculate a risk score (e.g., a risk score of "10" corresponding to the "high" risk level, a risk score of "1" corresponding to the "low" risk level) for the asset based on the first risk level assigned to the first attribute category.

In another example, the computer system: assigns the first risk score (e.g., a risk score of "10") to the first attribute category exhibiting the first combination of attributes; and, for each asset in the first asset group exhibiting the first combination of attributes, assigns the first risk score to the asset.

In another implementation, the computer system can: generate a notification specifying the asset group (e.g., including the first asset) and a set of risk scores assigned to each asset in the asset group in Block S150; and serve the notification to the operator portal (or via an API) in Block S152.

11.1 Risk-Based Actions

Block S154 of the method S100 recites, in response to the first risk score exceeding a risk threshold, executing a first action on the first asset.

Generally, the computer system can execute an action in response to a risk level (or score)—associated with an asset—exceeding a risk threshold.

In one implementation, the computer system can access a policy defining a risk threshold (e.g., a "high" risk level, a risk score of "7") and an action—such as quarantining a device, uninstalling an application, revoking user permissions, etc.—responsive to a risk score, associated with an asset, exceeding the risk threshold.

In this implementation, the computer system can execute the foregoing methods and techniques to calculate a first risk score to the first asset based on the first set of attributes and the first subset of attributes, in the second set of attributes, associated with the first asset and/or based on a risk level assigned to the first attribute category. Then, the computer system can execute an action on the first asset in response to the first risk score exceeding the risk threshold in Block S154.

11.1 Risk Update

In one implementation, in response to executing an action on an asset, the computer system can update a risk score of the asset based on a set of attributes exhibited by the asset during a succeeding time interval. More specifically, the computer system can execute the foregoing methods and techniques: to access an updated set of attributes exhibited by an asset during the succeeding time interval; to calculate an updated risk score for the asset based on the updated set of attributes; to generate a notification specifying the asset and the updated risk score; and to serve the notification to the operator portal.

For example, the computer system can: access a first set of attributes exhibited by a first device during a first time interval; access a second set of attributes—including a first attribute representing presence of a known vulnerability—exhibited by a first application during the first time interval; based on an association between the first device and the first application (e.g., the first application installed on the first device during the first time interval), associate the first device with a first subset of attributes (e.g., the first attribute) in the second set of attributes; and calculate a first risk score (e.g., a risk score of "10") to the first device based on the first set of attributes and the first subset of attributes including the first attribute.

In this example, the computer system can: remove (e.g., uninstall) the first application from the first device; access a third set of attributes exhibited by the first device during a second time interval succeeding the first time interval; remove the association between the first device and the first application in response to removing the first application from the first device; and calculate a second risk score (e.g., a risk score of "2") to the first device based on the third set of attributes (and absence of an association with the first attribute), the second risk score falling below the first risk score.

10.2 Asset Movement Between Asset Groups

Blocks of the method S100 recite: identifying a set of actions to cause assets, in the first asset group, to exhibit the second target combination of attributes during a second time interval succeeding the first time interval in Block S144; generating a second notification specifying the set of actions in Block S150; serving the second notification to the operator portal in Block S152; and autonomously executing the set of actions on assets in the first asset group in Block S154.

Generally, the computer system can execute the foregoing methods and techniques: to define a first attribute category exhibiting a first target combination of attributes; to assign a first risk level (e.g., a "high" risk level) to the first attribute category; to identify a first asset group exhibiting the first target combination of attributes during a first time interval; and to calculate risk scores for assets in the first asset group based on the first risk level.

Figure 3B:
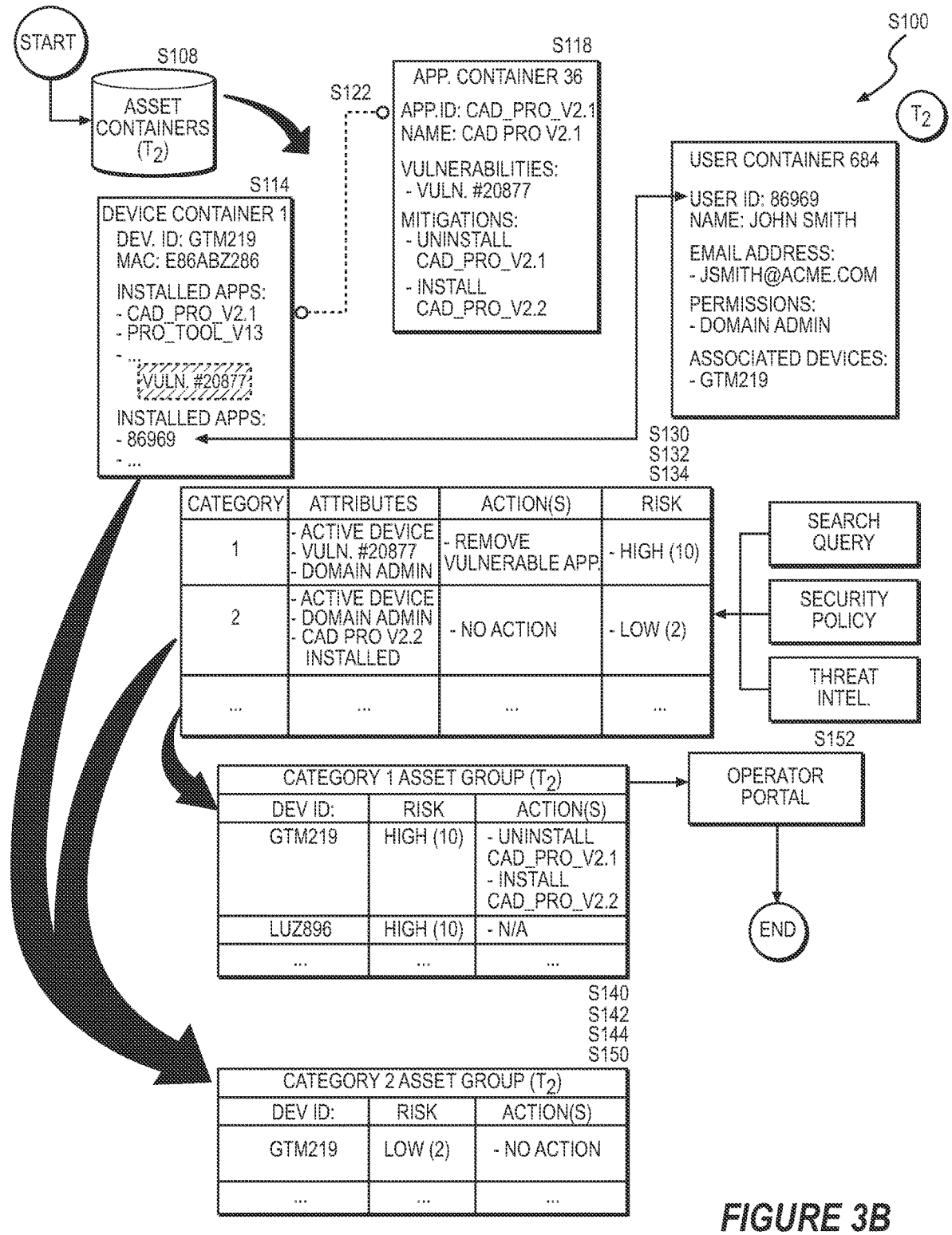

Additionally, as shown in FIG. 3B, the computer system can execute the foregoing methods and techniques: to define a second attribute category exhibiting a second target combination of attributes; and to assign a second risk level (e.g., a "low" risk level) to the second attribute category, the second risk level falling below the first risk level.

In one implementation, in Block S144, the computer system can identify a set of actions to cause assets, in the first asset group, to exhibit the second target combination of attributes (and/or to place assets in the first asset group in compliance with a security policy associated with the second attribute category) during a second time interval succeeding the first time interval. The computer system can: generate a notification specifying the set of actions in Block S150; and serve the notification to the operator portal in Block S152.

Additionally or alternatively, the computer system can execute (e.g., autonomously, in response to a command received at the operator portal) the set of actions on assets in the first asset group in Block S154.

In one example, the computer system defines a first attribute category exhibiting a first target combination of attributes including: a first attribute representing a first application type (e.g., a productivity application type); and a second attribute representing presence of a known vulnerability. The computer system assigns a first risk level (e.g., a "high" risk level) to the first attribute category based on the second attribute.

Additionally, the computer system defines a second attribute category exhibiting a second target combination of attributes: including the first attribute representing the first application type; and excludes the second attribute representing presence of the known vulnerability. The computer system assigns a second risk level (e.g., a "low" risk level) to the second attribute category based on absence of the second attribute from the second target combination of attributes.

In this example, the computer system executes the foregoing methods and techniques to identify a first asset group including a first asset exhibiting the first target combination of attributes during a first time interval, the first asset including a first device on which a second asset—including a first application exhibiting the first application type and exhibiting the known vulnerability—is installed.

In response to identifying the first asset group, the computer system identifies a first set of actions to cause assets, in the first asset group, to exhibit the second target combination of attributes during a second time interval succeeding the first time interval. More specifically, the computer system identifies the first set of actions including: removing the first application from the first device exhibiting the first application installed thereon; and installing a third asset—including a second application exhibiting the first application type and excluding the known vulnerability on the first device—on the first device. Additionally, the computer system calculates a set of risk scores for the first asset group—such as a first risk score of "10" for the first device—based on the first risk level assigned to the first attribute category.

In this example, the computer system: generates a notification specifying the first asset group, the set of risk scores, and/or the first set of actions; and serves the notification at an operator portal. Additionally or alternatively, the computer system executes the first set of actions on assets in the first asset group including the first asset.

Then, in response to executing the first set of actions on assets in the first asset group, the computer system executes the foregoing methods and techniques to identify a second asset group including a first asset exhibiting the second target combination of attributes—rather than the first target combination of attributes—during a second time interval succeeding the first time interval. The computer system calculates a second risk score to the first asset based on the second risk level assigned to the second attribute category, the second risk score falling below the first risk score.

10.2.1 Example: Attribute Combination Proximity

In one example, the computer system can generate a first asset group characterized by a high risk level and defined by a first combination of attributes including a first CAD application exhibiting a vulnerability installed thereon, the first asset group including a first device assigned to an engineer user and a second device assigned to an executive, the first device and the second device including the first CAD application installed thereon. The computer system can: identify a second asset group characterized by a low risk level and defined by a second combination of attributes (e.g., a combination of attributes exhibiting a maximal proximity to a first set of attributes characterizing the first device) including assignment to a user characterized by an engineer role, an absence of the first CAD application, and a second CAD application (absent the vulnerability) installed thereon; identify a first set of actions to the first device to cause the first device to exhibit the second combination of attributes (e.g., uninstall the first CAD application and install the second CAD application); present a list specifying the first set of actions to an operator; and/or autonomously push an update—effecting the first set of actions—to the first device.

In this example, the computer system can also identify a third asset group characterized by a low risk level and defined by a third combination of attributes (e.g., a combination of attributes exhibiting a maximal proximity to a second set of attributes characterizing the second device) including assignment to a user characterized by an executive role, and an absence of the first CAD application and the second CAD application (i.e., policy may not allow an executive user to access the second CAD application requiring a paid license). The computer system can then: identify a second set of actions to the second device to cause the second device to exhibit the third combination of attributes (e.g., uninstall the first CAD application; present a list specifying the second set of actions to the operator; and/or autonomously push an update)—effecting the second set of actions—to the second device.

Accordingly, the computer system can: group assets into asset groups based on predefined combinations of attributes; associate the asset groups with varying levels of risk based on these combinations of attributes; and identify actions (or actionable prompts for security operators) to move assets from a high-risk asset group to a low-risk asset group (or a set of low risk asset groups) based on attributes of these assets and/or policies of these asset groups, thereby reducing an individual risk level for each of these assets—and an overall risk level for the computer network—while complying with a set of policies of an organization.

12. Conclusion

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   accessing a first set of objects, generated by a set of sources during a first time interval, representing attributes of a first set of assets comprising a first asset and a second asset;
   partitioning the first set of objects into a first set of object groups, each object group in the first set of object groups representing an asset in the first set of assets;
   for each object group in the set of object groups, aggregating attributes represented in objects in the object group into an asset container, in a set of asset containers, representing an asset in the first set of assets;
   accessing a first set of attributes, from a first asset container in the set of asset containers, exhibited by the first asset during the first time interval;
   identifying a first association between the first asset and the second asset based on the first set of attributes;
   accessing a second set of attributes, from a second asset container in the set of asset containers, exhibited by the second asset during the first time interval;
   based on the first association between the first asset and the second asset, associating the first asset with a first subset of attributes in the second set of attributes;
   defining a first attribute category exhibiting a target combination of attributes;
   identifying a first asset group, comprising the first asset group, exhibiting the target combination of attributes during the first time interval based on the target combination of attributes represented in:
      the first set of attributes; and
      the first subset of attributes, in the second set of attributes, associated with the first asset;
   generating a first notification specifying the first asset group; and
   serving the first notification at an operator portal.

2. The method of claim 1:
   further comprising:
      assigning a risk level to the first attribute category; and
      calculating a first risk score to the first asset based on:
         the risk level assigned to the first attribute category; and
         the target combination of attributes represented in the first set of attributes and the first subset of attributes, in the second set of attributes, associated with the first asset; and
   wherein generating the first notification comprises generating the first notification further specifying the first risk score.

3. The method of claim 2, further comprising:
   assigning a first action to the first attribute category; and
   in response to the first score exceeding a risk threshold, executing the first action, assigned to the first attribute category, on the first asset group.

4. The method of claim 1:
   wherein defining the first attribute category comprises defining the first attribute category exhibiting the target combination of attributes comprising:
      a first subcombination of attributes associated with assets characterized by the first asset class; and
      a second subcombination of attributes associated with assets characterized by the second asset class; and
   wherein identifying the first asset group comprises identifying the first asset group comprising the first asset based on:
      the first set of attributes, exhibited by the first asset characterized by the first asset class, comprising a first subset of attributes corresponding to the first subcombination of attributes in the target combination of attributes; and
      the first subset of attributes, in the second set of attributes exhibited by the second asset characterized by the second asset class, comprising a second subset of attributes corresponding to the second subcombination of attributes in the target combination of attributes.

5. The method of claim 4:
further comprising:
- generating a first manifest of assets during the first time interval based on a first subset of asset containers in the set of asset containers, the first manifest of assets comprising a first subset of assets, in the first set of assets, characterized by the first asset class, the first subset of assets comprising the first asset; and
- generating a second manifest of assets during the first time interval based on a second subset of asset containers in the set of asset containers, the second manifest of assets comprising a second subset of assets, in the first set of assets, characterized by the second asset class, the second subset of assets comprising the second asset; and wherein identifying the first asset group further comprises:
- identifying a third subset of assets, in the first manifest of assets, exhibiting the first subcombination of attributes during the first time interval;
- identifying a fourth subset of assets, in the second manifest of assets, exhibiting the second subcombination of attributes during the first time interval; and
- identifying the first asset group comprising the first asset in response to:
  - identifying the third subset of assets comprising the first asset;
  - identifying the fourth subset of assets comprising the second asset; and
  - identifying the first association between the first asset and the second asset.

6. The method of claim 4:
further comprising generating a first database query comprising:
- a first operation representing the first subcombination of attributes; and
- a second operation representing the second combination of attributes; and wherein identifying the first asset group further comprises identifying the first asset group in response to executing the first database query.

7. The method of claim 1, further comprising:
- accessing a second set of objects, generated by the set of sources during a second time interval succeeding the first time interval, representing attributes of a second set of assets comprising the first asset and the second asset;
- partitioning the second set of objects into a second set of object groups, each object group in the second set of object groups representing an asset in the second set of assets;
- for each object group in the set of object groups, aggregating attributes represented in objects in the object group into an asset container, in the set of asset containers, representing an asset in the second set of assets;
- accessing a third set of attributes, from the first asset container, exhibited by the first asset during the second time interval;
- removing the first association between the first asset and the second asset based on the third set of attributes;
- identifying a second asset group, excluding the first asset, exhibiting the target combination of attributes during the second time interval based on the third set of attributes excluding the target combination of attributes;
- generating a second notification specifying the second asset group excluding the first asset; and
- serving the second notification at an operator portal.

8. The method of claim 7:
- wherein accessing the first set of attributes comprises accessing the first set of attributes exhibited by the first asset, the first asset comprising a first device, the first set of attributes comprising a first attribute representing a first set of applications installed on the first device, the first set of applications comprising the second asset, the second asset comprising a first application;
- wherein identifying the first association comprises identifying the first association between the first asset and the second asset based on the first attribute;
- wherein accessing the second set of attributes comprises accessing the second set of attributes exhibited by the second asset, the second set of attributes comprising a second attribute representing presence of a known vulnerability associated with the first application;
- further comprising removing the first application from the first device in response to identifying the first asset group comprising the first asset;
- wherein accessing the third set of attributes comprises accessing the third set of attributes comprising a third attribute representing a second set of applications installed on the first device, the second set of applications excluding the first application; and
- wherein removing the first association comprises removing the first association between the first asset and the second asset in response to the second set of applications excluding the first application.

9. The method of claim 1, wherein aggregating attributes comprises:
- aggregating a second subset of attributes, in the first set of attributes, into a first table in the first asset container, each attribute in the second subset of attributes exhibiting a string data type; and
- aggregating a third subset of attributes, in the first set of attributes, into a second table in the first asset container, each attribute in the third subset of attributes exhibiting an integer data type.

10. The method of claim 9:
- wherein defining the first attribute category comprises receiving a search query, from the operator portal, specifying the target combination of attributes;
- further comprising generating a first database query comprising a first operation representing a first attribute, in the target combination of attributes, exhibiting the string data type; and
- wherein identifying the first asset group further comprises identifying the first asset group comprising the first asset in response to executing the first database query on the first table.

11. The method of claim 1:
- wherein accessing the first set of objects comprises accessing the first set of objects representing attributes of the first set of assets affiliated with a first organization exhibiting a first organization type; and
- wherein defining the first attribute category comprises:
  - aggregating a corpus of search queries, received from a set of organizations exhibiting the first organization type, specifying combinations of attributes;
  - calculating a first quantity of search queries, in the corpus of search queries, specifying the target combination of attributes; and
  - defining the first attribute category exhibiting the target combination of attributes in response to the first quantity of search queries exceeding a first threshold quantity.

12. The method of claim 11, further comprising:
in response to the first quantity of search queries exceeding a first threshold, generating a recommended search query specifying the target combination of attributes;
generating a second notification specifying the recommended search query; and
serving the second notification to the operator portal.

13. The method of claim 1, further comprising:
defining a second attribute category exhibiting a second target combination of attributes;
identifying a set of actions to cause assets, in the first asset group, to exhibit the second target combination of attributes during a second time interval succeeding the first time interval;
generating a second notification specifying the set of actions; and
serving the second notification to the operator portal.

14. The method of claim 13:
wherein defining the first attribute category comprises defining the first attribute exhibiting the target combination of attributes comprising:
a first attribute representing a first application type; and
a second attribute representing presence of a known vulnerability;
wherein defining the second attribute category comprises defining the first attribute exhibiting the second target combination of attributes:
comprising the first attribute representing the first application type; and
excluding the second attribute representing presence of the known vulnerability; and
wherein identifying the set of actions comprises identifying the set of actions comprising:
removing the second asset, comprising a first application exhibiting the first application type and exhibiting the known vulnerability, from the first asset comprising a first device exhibiting the first application installed thereon; and
installing a third asset, in the set of assets, on the first device, the third asset comprising a second application exhibiting the first application type and excluding the known vulnerability.

15. The method of claim 13, further comprising:
assigning a first risk level to the first attribute category;
assigning a second risk level to the second attribute category, the second risk level falling below the first risk level;
calculating a first risk score to the first asset based on the first risk level assigned to the first attribute category;
autonomously executing the set of actions on the first asset;
identifying a second asset group exhibiting the second target combination of attributes during the second time interval, the second asset group comprising the first asset; and
calculating a second risk score to the first asset based on the second risk level assigned to the second attribute category.

16. A non-transitory computer readable medium storing instructions that, when executed by a processor, cause the processor to:
access a first set of objects, generated by a set of sources during a first time interval, representing attributes of a first set of assets comprising a first asset and a second asset;
partition the first set of objects into a first set of object groups, each object group in the first set of object groups representing an asset in the first set of assets;
for each object group in the set of object groups, aggregate attributes represented in objects in the object group into an asset container, in a set of asset containers, representing an asset in the first set of assets;
access a first set of attributes, from a first asset container in the set of asset containers, exhibited by the first asset during the first time interval;
identify a first association between the first asset and the second asset based on the first set of attributes;
access a second set of attributes, from a second asset container in the set of asset containers, exhibited by the second asset during the first time interval;
based on the first association between the first asset and the second asset, associate the first asset with a first subset of attributes in the second set of attributes;
define a first attribute category exhibiting a target combination of attributes;
identify a first asset group, comprising the first asset group, exhibiting the target combination of attributes during the first time interval based on the target combination of attributes represented in:
the first set of attributes; and
the first subset of attributes, in the second set of attributes, associated with the first asset;
generate a first notification specifying the first asset group; and
serve the first notification at an operator portal.

17. The non-transitory computer readable medium of claim 16, wherein the non-transitory computer readable medium stores instructions that, when executed by the processor, cause the processor to:
assign a risk level to the first attribute category;
calculate a first risk score to the first asset based on:
the risk level assigned to the first attribute category; and
the target combination of attributes represented in the first set of attributes and the first subset of attributes, in the second set of attributes, associated with the first asset; and
generate the first notification further specifying the first risk score.

18. The non-transitory computer readable medium of claim 17, wherein the non-transitory computer readable medium stores instructions that, when executed by the processor, cause the processor to:
assign a first action to the first attribute category; and
in response to the first score exceeding a risk threshold, execute the first action, assigned to the first attribute category, on the first asset group.

19. The non-transitory computer readable medium of claim 16, wherein the non-transitory computer readable medium stores instructions that, when executed by the processor, cause the processor to:
define the first attribute category exhibiting the target combination of attributes comprising:
a first subcombination of attributes associated with assets characterized by the first asset class; and
a second subcombination of attributes associated with assets characterized by the second asset class; and
identify the first asset group comprising the first asset based on:
the first set of attributes, exhibited by the first asset characterized by the first asset class, comprising a first subset of attributes corresponding to the first subcombination of attributes in the target combination of attributes; and the first subset of attributes, in the second set of attributes exhibited by the second asset characterized by the second asset class, comprising a second subset of attributes corresponding to the second subcombination of attributes in the target combination of attributes.

20. A system comprising:

a processor; and a memory coupled to the processor, the memory storing instructions that, when executed by the processor, cause the processor to:

access a first set of objects, generated by a set of sources during a first time interval, representing attributes of a first set of assets comprising a first asset and a second asset;

partition the first set of objects into a first set of object groups, each object group in the first set of object groups representing an asset in the first set of assets;

for each object group in the set of object groups, aggregate attributes represented in objects in the object group into an asset container, in a set of asset containers, representing an asset in the first set of assets;

access a first set of attributes, from a first asset container in the set of asset containers, exhibited by the first asset during the first time interval;

identify a first association between the first asset and the second asset based on the first set of attributes;

access a second set of attributes, from a second asset container in the set of asset containers, exhibited by the second asset during the first time interval;

based on the first association between the first asset and the second asset, associate the first asset with a first subset of attributes in the second set of attributes;

define a first attribute category exhibiting a target combination of attributes;

identify a first asset group, comprising the first asset group, exhibiting the target combination of attributes during the first time interval based on the target combination of attributes represented in:

the first set of attributes; and the first subset of attributes, in the second set of attributes, associated with the first asset;

generate a first notification specifying the first asset group; and serve the first notification at an operator portal.

\* \* \* \* \*